(12) United States Patent
Nakao

(10) Patent No.: US 9,983,789 B2
(45) Date of Patent: May 29, 2018

(54) APPARATUS, METHOD, AND PROGRAM PRODUCT FOR POINTING TO AT LEAST ONE KEY ON A SOFTWARE KEYBOARD

(71) Applicant: LENOVO (Singapore) PTE, LTD., New Tech Park (SG)

(72) Inventor: Takenobu Nakao, Tokyo-to (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 240 days.

(21) Appl. No.: 14/955,399

(22) Filed: Dec. 1, 2015

(65) Prior Publication Data

US 2016/0154582 A1   Jun. 2, 2016

(30) Foreign Application Priority Data

Dec. 2, 2014  (JP) ................................ 2014-244484

(51) Int. Cl.
| | |
|---|---|
| G06F 13/00 | (2006.01) |
| G06F 15/00 | (2006.01) |
| G06F 3/0489 | (2013.01) |
| G06F 3/0488 | (2013.01) |

(52) U.S. Cl.
CPC ...... *G06F 3/04895* (2013.01); *G06F 3/04886* (2013.01)

(58) Field of Classification Search
CPC ..................... G06F 3/0233; G06F 2203/0381
USPC ......................................... 715/773, 781, 748
See application file for complete search history.

(56) References Cited

U.S. PATENT DOCUMENTS

| | | | | |
|---|---|---|---|---|
| 2011/0007004 A1* | 1/2011 | Huang | ................... | G06F 3/0237 345/173 |
| 2013/0305181 A1* | 11/2013 | Umetsu | ................. | G06F 3/0233 715/773 |
| 2013/0307804 A1* | 11/2013 | Adachi | ................... | G06F 3/016 345/173 |
| 2015/0103010 A1* | 4/2015 | Zhang | ................... | G06F 3/0202 345/168 |
| 2015/0185868 A1* | 7/2015 | Bevoor | ................... | G06F 3/018 345/171 |

FOREIGN PATENT DOCUMENTS

| | | |
|---|---|---|
| JP | 10-083248 | 3/1998 |
| JP | 2003-067098 | 3/2003 |
| JP | 2012-118810 | 6/2012 |

* cited by examiner

*Primary Examiner* — Kevin Nguyen
(74) *Attorney, Agent, or Firm* — Kunzler, PC

(57) ABSTRACT

Apparatuses, methods, and program products are disclosed for pointing to at least one key on a software keyboard. By use of a processor, a keyboard is displayed on a display device. At least one indicator that emphasizes at least one key of the keyboard is displayed. The at least one indicator may be at least one of a band, a pointing mark, and circles gradually decreasing in size.

18 Claims, 8 Drawing Sheets

APPARATUS, METHOD, AND PROGRAM PRODUCT FOR POINTING TO AT LEAST ONE KEY ON A SOFTWARE KEYBOARD

BACKGROUND

Description of the Related Art

Certain devices include a software keyboard for displaying, on a display screen, display content such as alphabetical letters, characters, and symbols typically arranged on a hardware keyboard. Such a software keyboard may enable input using displayed keys of the software keyboard on the display screen.

SUMMARY

An apparatus for pointing to at least one key on a software keyboard is disclosed. A method and computer program product also perform the functions of the apparatus. In one embodiment, the apparatus includes a display device, a processor, and a memory that stores code executable by the processor. The code, in various embodiments, is executable by the processor to display a keyboard on the display device. In a further embodiment, the code is executable by the processor to display at least one indicator that emphasizes at least one key of the keyboard.

In some embodiments, the at least one indicator includes at least one of a horizontal indicator and a vertical indicator. In certain embodiments, the keyboard is a QWERTY layout keyboard, and the at least one key includes "F" and "J" keys that correspond to positions on the display device on which left and right index fingers are positioned when an operator's hands are on a home position of the keyboard. In various embodiments, the at least one indicator includes a band that extends in at least one of a horizontal direction and a vertical direction and includes the at least one key of the keyboard. In such embodiments, the band may be displayed in a different color than keys of the keyboard and the band may be displayed to blink.

In a further embodiment, the at least one indicator includes at least one pointing mark positioned outside of the keyboard area, and the at least one pointing mark points to the at least one key in at least one of a horizontal direction and a vertical direction. In another embodiment, the at least one indicator includes circles gradually decreasing in size at predetermined time intervals. In some embodiments, the display device is a touch-sensitive display device that receives a touch input.

In certain embodiments, the display device includes a first touch panel display and a second touch panel display. In such embodiments, the apparatus may include a portable computing device including a first chassis having the first touch panel display, a second chassis having the second touch panel display, and connecting parts for rotatably supporting the second chassis at least 180 degrees with respect to the first chassis. Further, in such embodiments, the keyboard may be displayed on one of the first touch panel display and the second touch panel display. In various embodiments, when the portable computing device is in a clamshell state, the display device displays the keyboard on the first touch panel display, and the at least one indicator includes a band that extends in a horizontal direction to include the at least one key of the keyboard and pointing marks on the second touch panel display to point the at least one key of the keyboard from a vertical direction.

A method for pointing to at least one key on a software keyboard, in one embodiment, includes displaying, by use of a processor, a keyboard on a display device. In some embodiments, the method includes displaying at least one indicator that emphasizes at least one key of the keyboard.

In some embodiments, displaying the at least one indicator includes displaying at least one of a horizontal indicator and a vertical indicator. In various embodiments, displaying the keyboard on the display device includes displaying a QWERTY layout keyboard. In such embodiments, the at least one key includes "F" and "J" keys that correspond to positions on the display device on which left and right index fingers are positioned when an operator's hands are on a home position of the keyboard.

In certain embodiments, displaying the at least one indicator includes displaying a band that extends in at least one of a horizontal direction and a vertical direction and includes the at least one key of the keyboard. In such embodiments, displaying the band may include displaying the band in a different color than keys of the keyboard and displaying the band to blink.

In various embodiments, displaying the at least one indicator includes displaying at least one pointing mark positioned outside of the keyboard area, and displaying the at least one pointing mark includes displaying the at least one pointing mark to point to the at least one key in at least one of a horizontal direction and a vertical direction. In one embodiment, displaying the at least one indicator includes displaying circles gradually decreasing in size at predetermined time intervals.

In one embodiment, a program product includes a computer readable storage medium that stores code executable by a processor. The executable code, in certain embodiments, includes code to perform displaying a keyboard on a display device. In a further embodiment, the executable code includes code to perform displaying at least one indicator that emphasizes at least one key of the keyboard.

In certain embodiments, displaying the at least one indicator includes displaying at least one of a horizontal indicator and a vertical indicator. In some embodiments, displaying the at least one indicator includes displaying a band that extends in at least one of a horizontal direction and a vertical direction and includes the at least one key of the keyboard.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
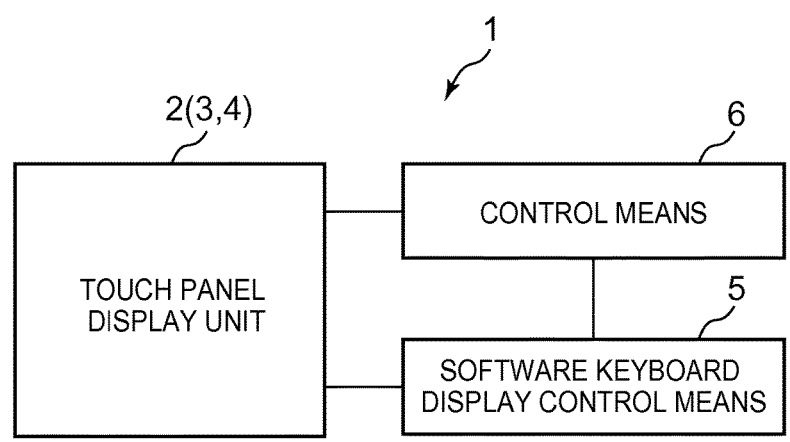
FIG. 1 is a schematic block diagram illustrating one embodiment of an input device.

Embodiments of a computer system, a method, and a computer-executable program that may include an input device, will be described below. Although components are shown in the drawings of this specification in one way, it may be easily understood that the components may be arranged and designed in a range of various configurations. Therefore, more detailed description of the embodiment of the device (e.g., apparatus, program product), method, and program to be described below is not intended to limit the scope as set forth in the claims, and is merely to show selected embodiments. It should be understood that those skilled in the art may carry out various embodiments even if one or more specific points are absent or even using any other method, parts, and materials.

Figure 8:
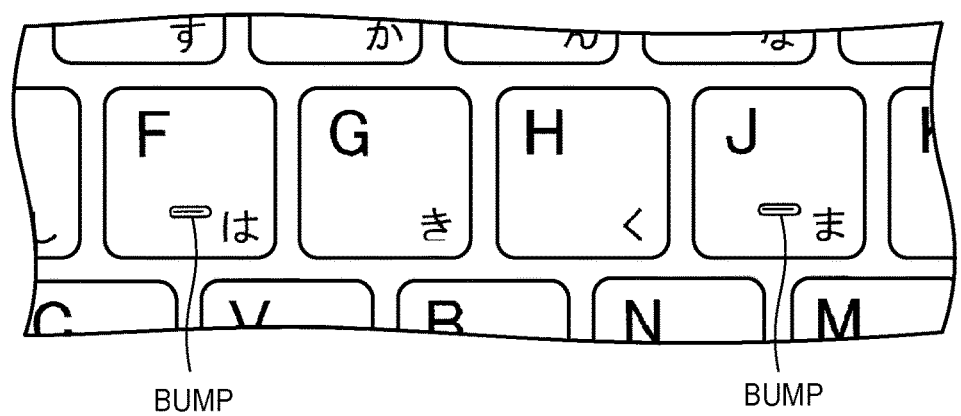
FIG. 8 is a schematic block diagram illustrating one embodiment of an area near home keys "F" and "J" of a hardware keyboard.

FIG. 8 is a schematic block diagram showing one embodiment of an area near home keys "F" and "J" of a hardware keyboard. In the hardware keyboard, as shown in FIG. 8, bumps or ridges are provided on the home keys "F" and "J." The home keys are home positions for index fingers of an operator's hands. The bumps or ridges are used in addition to the character notation of the letter/character keys to make the home positions detectable without looking at the home keys.

However, physical bumps or ridges cannot be provided on conventional software keyboards, and hence it is necessary to find a corresponding character key by viewing the character notation of the character keys. Accordingly, operability of a software keyboard may be more difficult as compared to a hardware keyboard (e.g., touch typing may be difficult).

FIG. 1 is a schematic block diagram illustrating one embodiment of an input device. In FIG. 1, an input device 1 includes: a touch panel display unit 2 having a touch panel 3 and a display 4 (e.g., display device); software keyboard display control means 5 for displaying a software keyboard on the touch panel display unit 2 and providing a pointing display (e.g., at least one indicator) for pointing to specific keys on the software keyboard from horizontal and vertical directions; and control means 6 for controlling the operation of the touch panel 3 and the display operation of the display 4 in the touch panel display unit 2 to provide a display, for example, according to operations on the software keyboard.

The software keyboard display control means 5 and the control means 6 can be configured in software and/or hardware. A computer may execute a program to implement the functions of the software keyboard display control means 5 and control means 6. As may be appreciated by one skilled in the art, the computer may include a processor and memory that stores code executable by the processor. Moreover, the memory may be a non-transitory computer readable storage medium.

The software keyboard may have the same character layout as that of a hardware keyboard, and the software keyboard is displayed on a screen. The keyboard character layouts may include a QWERTY layout (e.g., alphabetical layout) and a Japanese keyboard layout (e.g., Japanese ordering of kana). Although certain embodiments may include both, the description herein will be made by referring to the QWERTY layout.

As may be appreciated, the peripheral visual field of human eyes may be used to make it easier to recognize specific keys on a software keyboard even when an operator does not gaze directly at the specific keys on the software keyboard (e.g., without direct viewing). In other words, a pointing display in the peripheral visual field of the operator for pointing to specific keys on the software keyboard from horizontal and/or vertical directions may be used to make it easier to recognize the specific keys even when the operator does not gaze directly at the specific keys.

As used herein, the visual field may mean a number of degrees of visual angle capable of processing visual stimulus, which is measured based on the central fovea. The visual field of healthy individuals is about 60 degrees upward and 75 degrees downward in the vertical direction. In the case of a single eye, the visual field is about 60 degrees toward the nose and 100 degrees toward the ear in the horizontal direction. There exists about 120 degrees of an overlapped visual field of both eyes. Based on the central fovea, the right-and-left and up-and-down areas are called the left visual field, the upper visual field, and so on. A blind spot exists at a position of each eye about 15 degrees toward the ear. An area of about 20 degrees from the central fovea is called a central visual field. The remaining visual area from the visual field is called a peripheral visual field. The spatial resolution of the central visual field is high. Although the spatial resolution of the peripheral visual field is not as high as that of the central visual field, it is possible to use the peripheral visual field of an operator in order to make it easier to recognize specific keys on the software keyboard.

The software keyboard may be a QWERTY layout keyboard, and the specific key may be "F" and "J" keys (e.g., home keys) corresponding to positions at which the right and left index fingers are located when the operator places his or her hands in the home position of the software keyboard. The specific key may be one or more keys.

The pointing display (e.g., at least one indicator) may include at least one of a horizontal indicator and a vertical indicator to point to at least one key of the software keyboard.

The pointing display may include a distinct display of a band that extends in at least one of the horizontal direction and the vertical direction to include the specific keys on the software keyboard.

The distinct display of the band may include displaying the band in a color different from the keys on the software keyboard or blinking the band.

Further, the pointing display may include pointing marks displayed outside of the software keyboard to point to the specific keys from at least one of the horizontal direction and the vertical direction.

Further, the pointing display may contain a display of circles gradually decreasing in size at predetermined time intervals.

Figure 2:
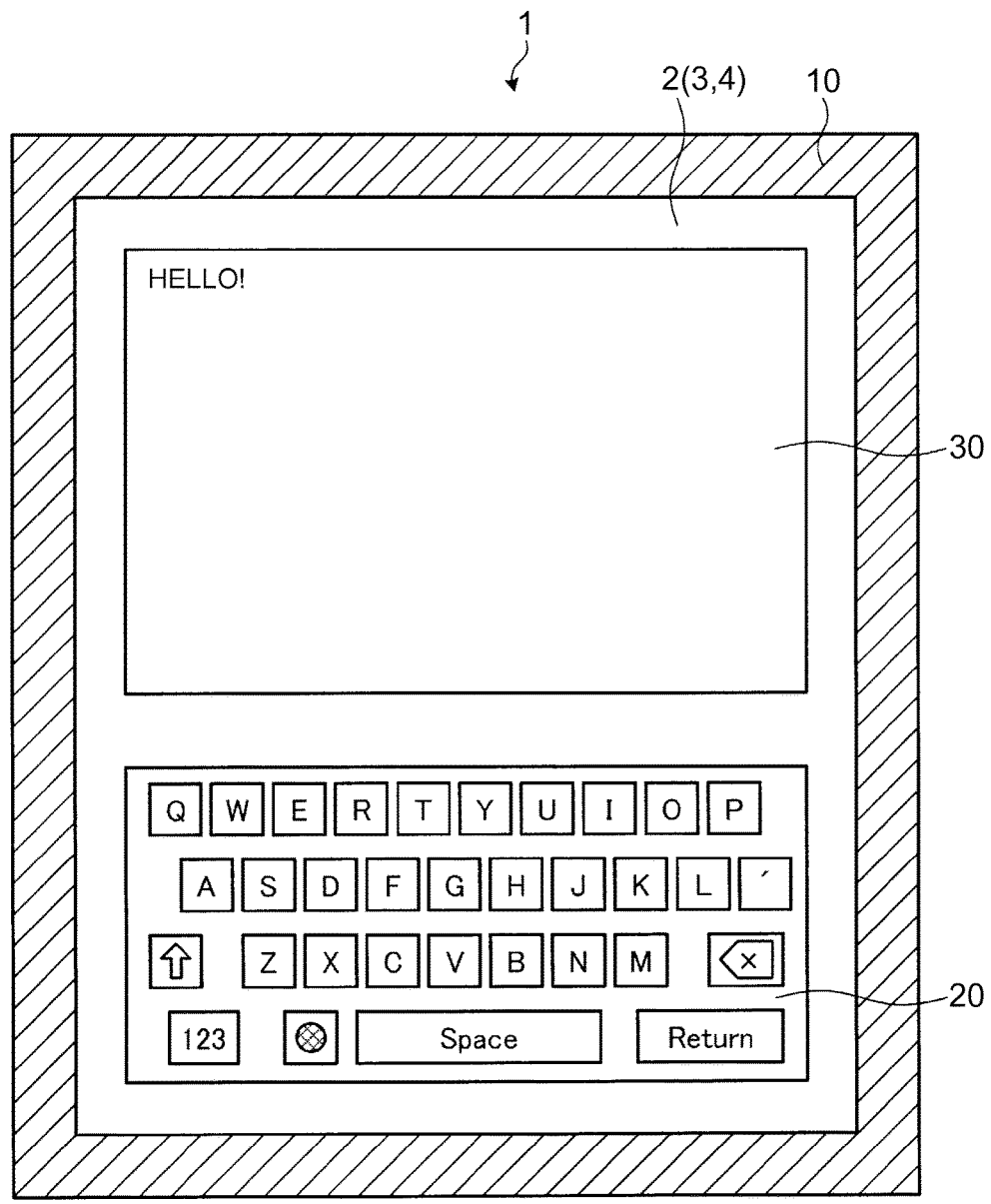
FIG. 2 is a schematic block diagram illustrating one embodiment of a tablet-type portable computing device that may include the input device.

FIG. 2 is a schematic block diagram illustrating one embodiment of a tablet-type portable computing device that may include the input device.

As shown in FIG. 2, the portable computing device includes a chassis 10 that may be formed into a hexahedron shape having a rectangular shape in plan view. In the portable computing device, the touch panel display unit 2 having the touch panel 3 and the display 4 is arranged on the front face of the chassis 10.

The touch panel display unit 2 is arranged substantially over the center of the front face. The touch panel display unit 2 has the display 4 with the touch panel 3 superimposed on the display 4. The touch panel 3 detects operations performed on the touch panel 3 using a pointer such as a finger or a pen together with the position on the touch panel 3 where the operation was performed, and notifies the control means 6 thereof. A capacitance type, a pressure-sensitive type, or the like can be used as the type of touch panel 3 to detect operations.

The display 4 may be, for example, a liquid crystal display ("LCD") or an organic electro-luminescence ("OLED") panel to display characters and graphics.

In the example shown in FIG. 2, a software keyboard 20 is displayed on the touch panel display unit 2 by the software keyboard display control means 5, and a text-editing area 30 is displayed by the control means 6 to provide a display according to operations on the software keyboard 20.

On the software keyboard 20, character keys Q, W, E, R, . . . are arrayed from the left of the upper line, character keys A, S, D, F, . . . are arrayed from the left of the middle line, and character keys Z, X, C, V, . . . are arrayed from the left of the lower line. In this embodiment, the home keys "F" and "J" may be the specific keys on the software keyboard 20.

The following will describe Embodiments 1 to 4 as display examples of the software keyboard 20 by the software keyboard display control means 5. In the following Embodiments 1 to 4, a pointing display for pointing toward the home keys "F" and "J" from the horizontal and vertical directions is provided to use the peripheral visual field of the operator in order to make it easier to recognize the home keys "F" and "J" even when the operator operates keys on the software keyboard 20 while viewing the text-editing area 30 (i.e., even when the operator does not gaze directly at the home keys "F" and "J"). This facilitates touch typing on the software keyboard 20.

Embodiment 1

Figure 3:
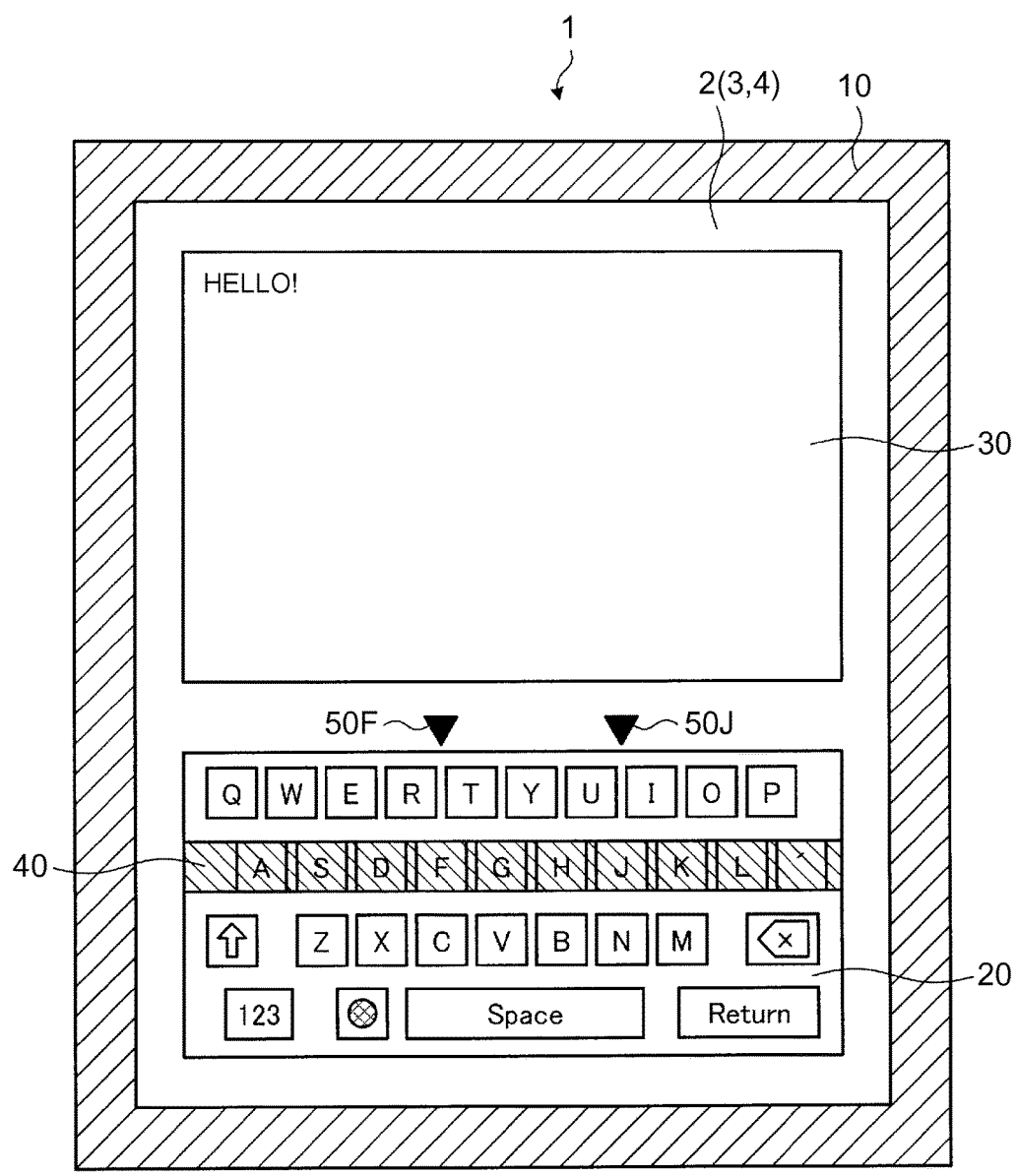
FIG. 3 is a schematic block diagram illustrating one embodiment of a display of the software keyboard.

FIG. 3 is a schematic block diagram illustrating one embodiment of a display of the software keyboard 20, in accordance with Embodiment 1. In Embodiment 1, a distinct display of a band 40 (e.g., indicator) that extends in the horizontal direction to include the home key "F" and the home key "J" on the software keyboard 20 is illustrated. The distinct display may display the band 40 in a color different from the keys on the software keyboard 20 or may blink the band 40. In addition, pointing marks 50F and 50J are displayed outside of the software keyboard 20 to point toward (e.g., emphasize) the home key "F" and the home key "J" from the vertical direction, respectively. Here, the pointing marks 50F and 50J are each a figure having the shape of an inverted triangle, but any other type of marks may be used as long as the figure can point to the home key "F" and the home key "J." For example, an arrow mark "↓" may also be used.

Thus, even when the operator operates keys on the software keyboard 20 while viewing the text-editing area 30 (i.e., even when the operator does not gaze directly at the home keys "F" and "J"), the distinct display of the band 40 in the horizontal direction and the pointing marks 50F and 50J in the vertical direction are perceived in the peripheral visual field of the operator, and this can make it easier to recognize a location of the home keys "F" and "J."

In Embodiment 1, although the band 40 that extends in the horizontal direction to include (e.g., emphasize) the home key "F" and the home key "J" on the software keyboard 20 is displayed in a distinct manner, and the pointing marks 50F and 50J are displayed outside of the software keyboard 20 to point toward (e.g., emphasize) the home key "F" and the home key "J" respectively from the vertical direction, certain embodiments are not limited to this configuration. Bands that extend in the vertical direction to include the home key "F" and the home key "J," respectively, may be displayed in a distinct manner, and pointing marks may be displayed outside of the software keyboard 20 to point toward (e.g., emphasize) the home key "F" and the home key "J" respectively from the horizontal direction.

Embodiment 2

Figure 4:
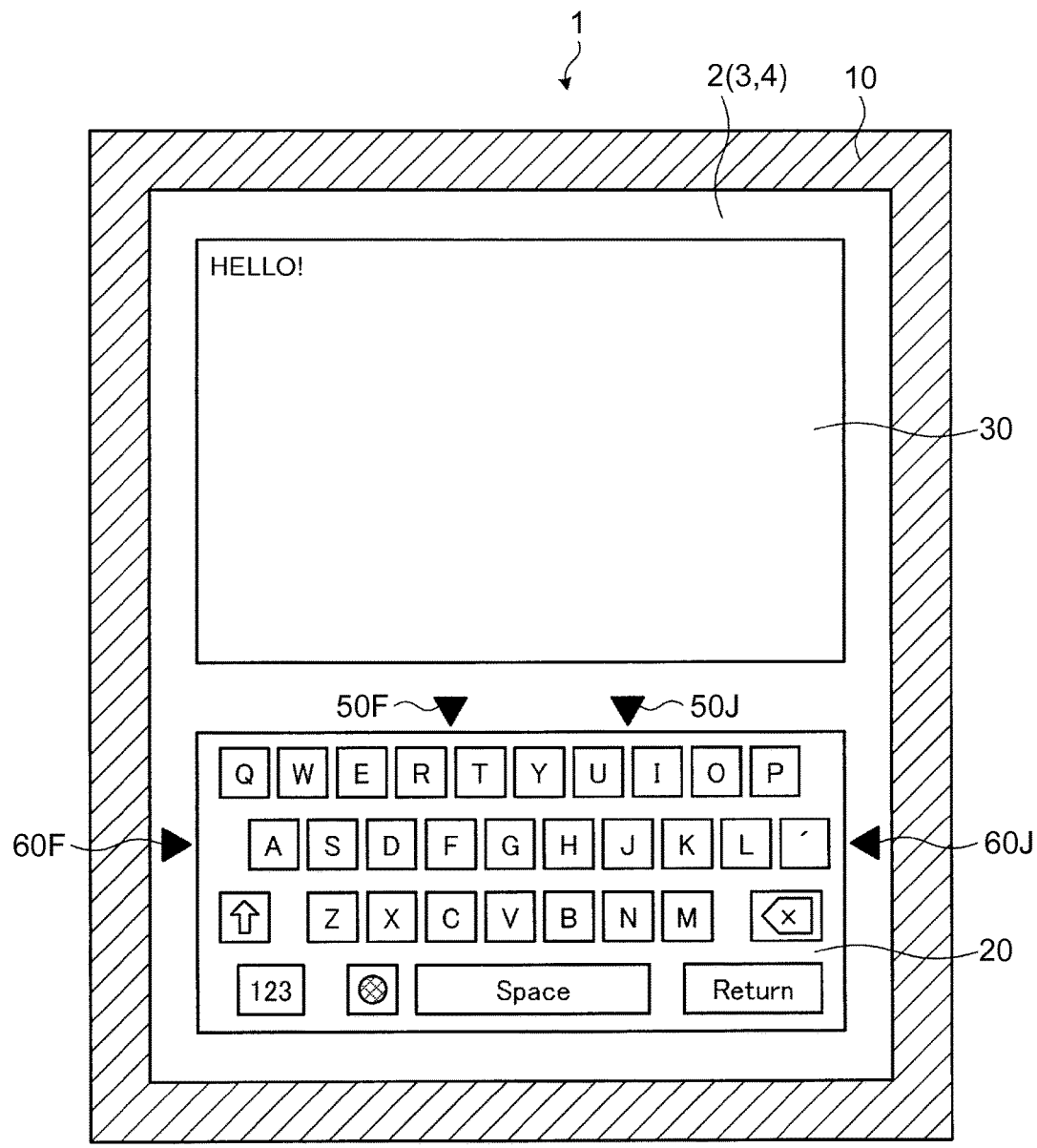
FIG. 4 is a schematic block diagram illustrating another embodiment of a display of the software keyboard.

FIG. 4 is a schematic block diagram illustrating another embodiment of a display of the software keyboard 20, in accordance with Embodiment 2. In Embodiment 2, the pointing marks 50F and 50J for pointing toward the home key "F" and the home key "J" respectively from the vertical direction, and pointing marks 60F and 60J for pointing toward the home key "F" and the home key "J" respectively from the horizontal direction are displayed outside of the software keyboard 20.

Thus, even when the operator operates keys on the software keyboard 20 while viewing the text-editing area 30 (i.e., even when the operator does not gaze directly at the home keys "F" and "J"), the pointing marks 50F and 50J in the vertical direction and the pointing marks 60F and 60J in the horizontal direction are perceived in the peripheral visual field of the operator, and this can make it easier to recognize the home keys "F" and "J."

Embodiment 3

Figure 5:
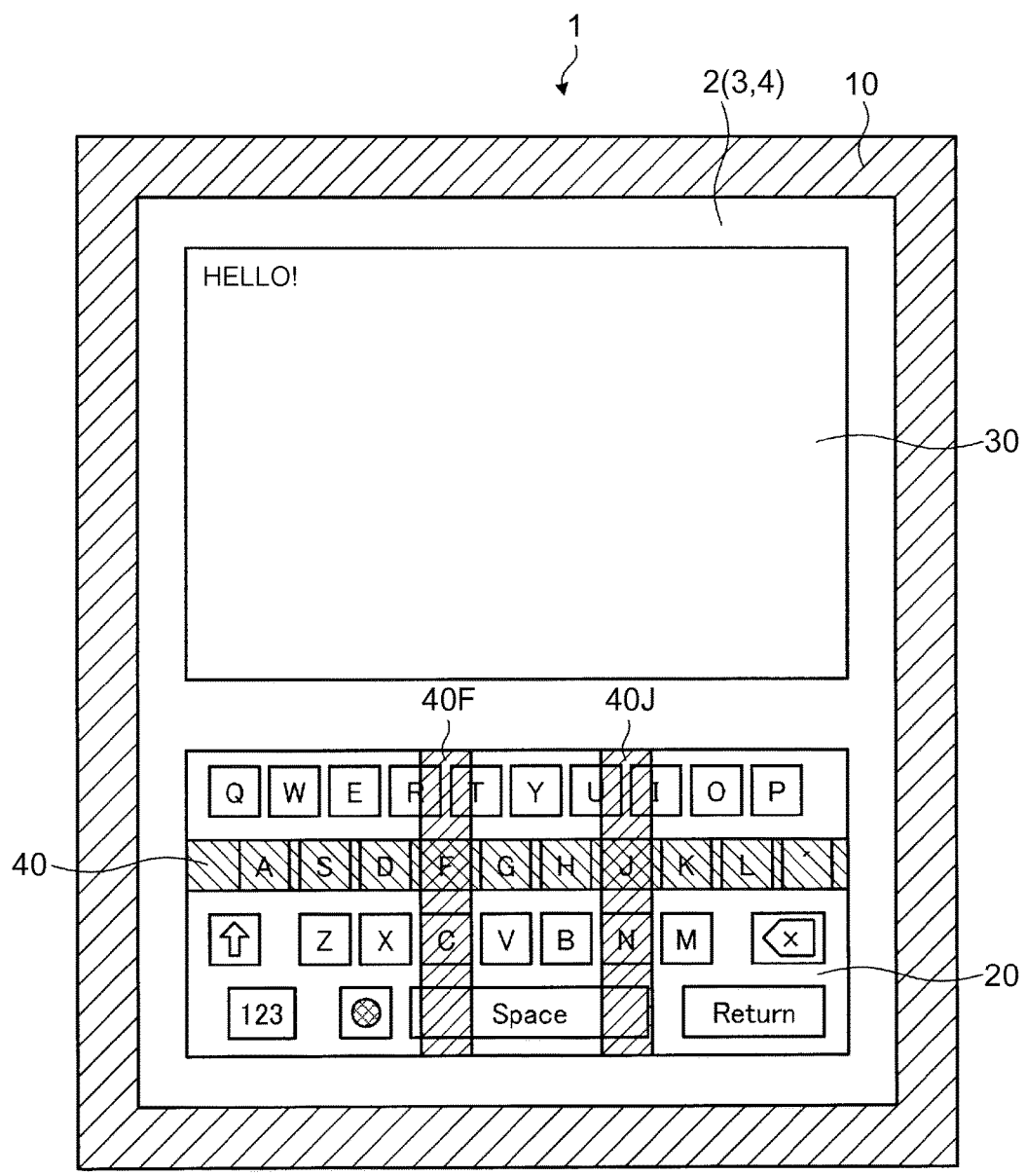
FIG. 5 is a schematic block diagram illustrating a further embodiment of a display of the software keyboard.

FIG. 5 is a schematic block diagram illustrating a further embodiment of a display of the software keyboard 20, in accordance with Embodiment 3. In Embodiment 3, the band 40 that extends in the horizontal direction to include the home key "F" and the home key "J" is displayed on the software keyboard 20 in a distinct manner, and bands 40F and 40J that extend in the vertical direction to include the home key "F" and the home key "J," respectively, are displayed on the software keyboard 20 in a distinct manner.

Thus, even when the operator operates keys on the software keyboard 20 while viewing the text-editing area 30 (i.e., even when the operator does not gaze directly at the home keys "F" and "J"), the distinct display of the band 40 in the horizontal direction and the bands 40F and 40J in the vertical direction are perceived in the peripheral visual field of the operator, and this can make it easier to recognize the home keys "F" and "J."

Embodiment 4

Figure 6:
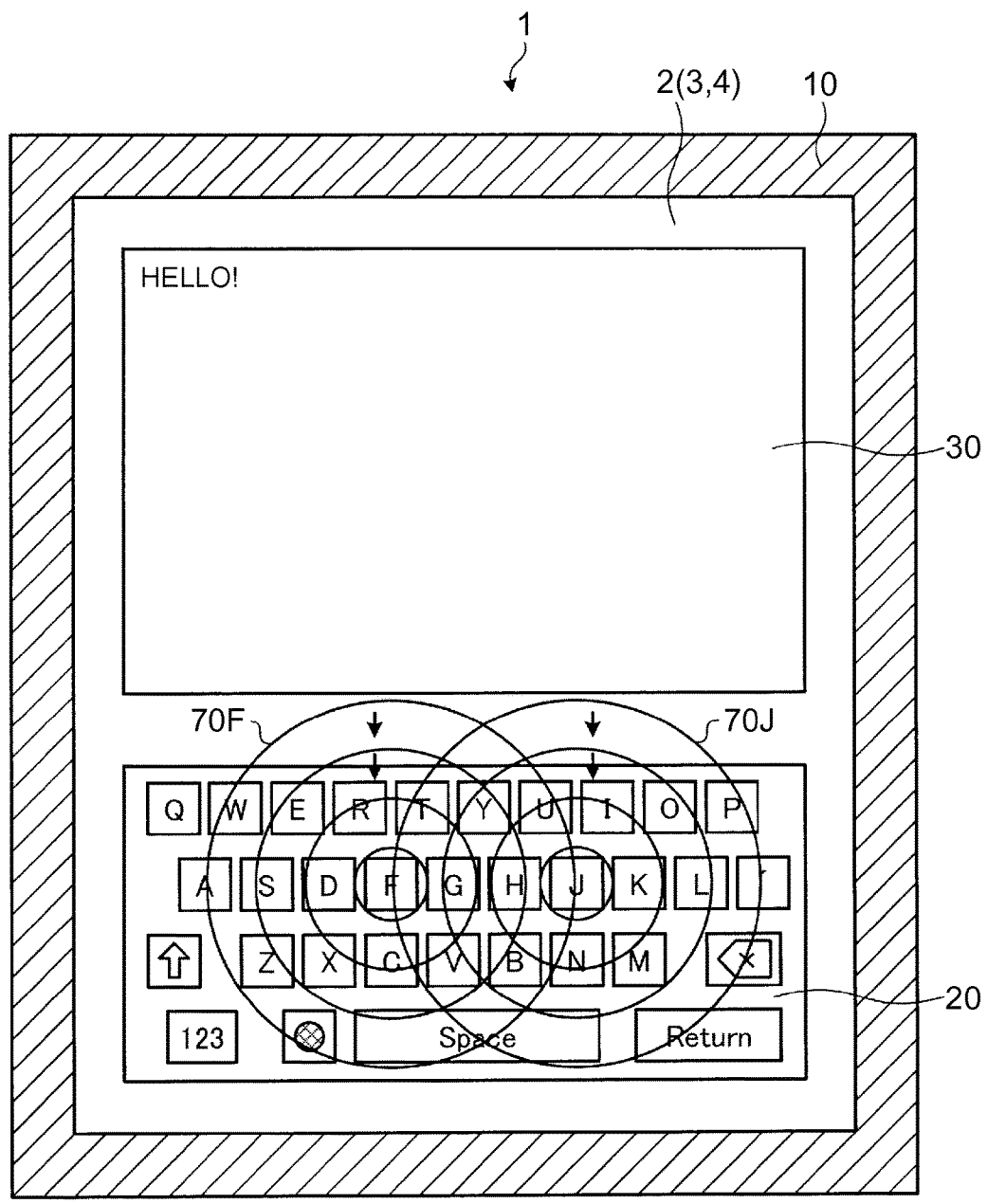
FIG. 6 is a schematic block diagram illustrating yet another embodiment of a display of the software keyboard.

FIG. 6 is a schematic block diagram illustrating yet another embodiment of a display of the software keyboard 20, in accordance with Embodiment 4. In Embodiment 4, circles 70F and 70J gradually decreasing in size at predetermined time intervals are displayed to point toward (e.g., emphasize) the home key "F" and the home key "J" from the horizontal and vertical directions on the software keyboard 20. In the example shown in FIG. 6, an embodiment in which the circles 70F and 70J are decreased in four steps is shown.

Thus, even when the operator operates keys on the software keyboard 20 while viewing the text-editing area 30 (i.e., even when the operator does not gaze directly at the home keys "F" and "J"), the circles 70F and 70J gradually decreasing in size at the predetermined time intervals are perceived in the peripheral visual field of the operator, and this can make it easier to recognize the home keys "F" and "J."

Note that Embodiments 1 to 4 may be carried out independently, or may be carried out in combination. Furthermore, the bands 40, 40F, and 40J, the pointing marks 50F, 50J, 60F, and 60J, and/or the circles 70F and 70J may all be considered indicators.

[Variation]

Figure 7:
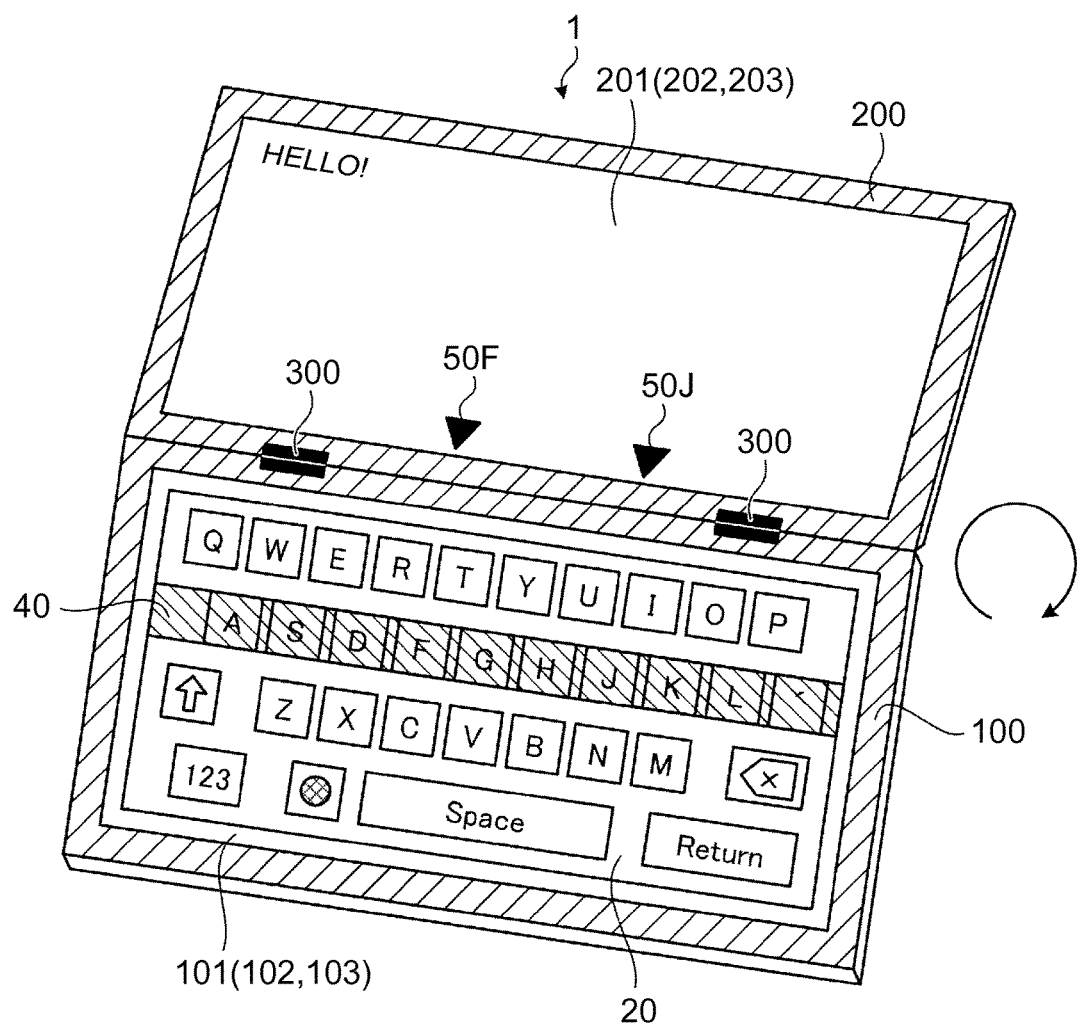
FIG. 7 is a schematic block diagram illustrating one embodiment of an openable/closable portable computing device that may include the input device.

In FIG. 2 mentioned above, one embodiment in which the input device 1 is used with the tablet-type portable computing device is described. However, certain embodiments are not limited thereto. One embodiment may be applied to an openable/closable portable computing device such as a double-screened smartphone. FIG. 7 is a schematic block diagram illustrating one embodiment of an openable/closable portable computing device that may include the input device.

As shown in FIG. 7, a portable computing device includes a first chassis 100 with a first touch panel display unit 101 provided therein, a second chassis 200 with a second touch panel display unit 201 provided therein, and a pair of hinges (connecting parts) 300 for rotatably connecting the first chassis 100 and the second chassis 200. The first touch panel display unit 101 has a first display 103 (e.g., display device) and a first touch panel 102 superimposed on the first display 103. The second touch panel display unit 201 has a second display 203 (e.g., display device) and a second touch panel 202 superimposed on the second display 203.

The hinges 300 connect the second chassis 200 to the first chassis 100 such that the first chassis 100 is substantially rotatable 360 degrees relative to the second chassis 200. When the angle between the first chassis 100 and the second chassis 200 is denoted by "θ," (1) a state where the first touch panel display unit 101 and the second touch panel display unit 201 inwardly face each other at angle 0=0 is called a closed state, (2) a state at an angle of 0<θ<180 is called a clamshell state, (3) a state at θ=180 is called a tablet state, and (4) a state where the first touch panel display unit 101 and the second touch panel display unit 201 are outward-looking at angle θ=360 is called an open state. Note that the hinges 300 may connect the second chassis 200 to the first chassis 100 such that the first chassis 100 is rotatable 180 degrees relative to the second chassis 200.

The software keyboard display control means 5 displays the software keyboard 20 on the first touch panel display unit 101 or the second touch panel display unit 201, and provides a pointing display for pointing specific keys on the software keyboard 20 from the horizontal and vertical directions as in Embodiments 1 to 4. The control means 6 may display the text-editing area on the first touch panel display unit 101 or the second touch panel display unit 201.

In the example shown in FIG. 7, an embodiment in which the portable computing device is in the clamshell state is shown. As an example, when the portable computing device is in the clamshell state, the software keyboard display control means 5 may display the software keyboard 20 on the first touch panel display unit 101 as shown in FIG. 7. Further, the control means 6 may display the text-editing area on the second touch panel display unit 201. Further, the software keyboard display control means 5 may provide a distinct display of the band 40 that extends in the horizontal direction to include the home key "F" and the home key "J" on the software keyboard 20 displayed on the first touch panel display unit 101. In the distinct display, the band 40 may be displayed in a color different from the keys on the software keyboard 20, or may be displayed to be blinking. In addition, the software keyboard display control means 5 may display, on the second touch panel display unit 201, the pointing marks 50F and 50J to point toward (e.g., emphasize) the home keys "F" and "J" on the software keyboard 20 from the vertical direction, respectively.

Thus, even when the operator operates keys on the software keyboard 20 while viewing the second touch panel display unit 201 (i.e., even when the operator does not gaze directly at the home keys "F" and "J"), the distinct display of the band 40 in the horizontal direction and the pointing marks 50F and 50J in the vertical direction are perceived in the peripheral visual field of the operator, and this can make it easier to recognize the home keys "F" and "J."

As described above, according to various embodiments, the pointing display is provided to point toward (e.g., emphasize) specific keys on the software keyboard 20 from the horizontal and vertical directions, and this can make it easier to recognize the specific keys using the peripheral visual field of the operator even if the operator does not gaze directly at the specific keys, enabling an improvement in the operability of the software keyboard. Further, the specific keys are made easier to recognize, and this may make touch typing easier.

In the aforementioned embodiment, the input device according to one embodiment is described by exemplifying the tablet type and double-screened type portable computing devices, but various embodiments are not limited to these devices, and is applicable to any other portable computing device such as a note PC, a cell-phone unit, a smartphone, a phablet, or a PDA.

Further, in the aforementioned embodiment, the QWERTY layout keyboard is used as the software keyboard, but various embodiments are not limited thereto, and a keyboard having any other key layout may also be used. In addition, the specific keys are not limited to the home keys "F" and "J," and any other key or keys may be used.

What is claimed is:

1. An apparatus comprising:
   a display device;
   a processor;
   a memory that stores code executable by the processor to:
      display a keyboard on the display device; and
      display at least one indicator that emphasizes at least one key of the keyboard, wherein the at least one indicator is separate from the at least one key of the keyboard, the keyboard is a QWERTY layout keyboard, and the at least one key comprises "F" and "J" keys that correspond to positions on the display device on which left and right index fingers are positioned when an operator's hands are on a home position of the keyboard.

2. The apparatus of claim 1, wherein the at least one indicator comprises at least one of a horizontal indicator and a vertical indicator.

3. The apparatus of claim 1, wherein the at least one indicator comprises a band that extends in at least one of a horizontal direction and a vertical direction and includes the at least one key of the keyboard.

4. The apparatus of claim 3, wherein the band is displayed in a different color than keys of the keyboard and the band is displayed to blink.

5. The apparatus of claim 1, wherein the at least one indicator comprises at least one pointing mark positioned outside of the keyboard area, and wherein the at least one pointing mark points to the at least one key in at least one of a horizontal direction and a vertical direction.

6. The apparatus of claim 1, wherein the at least one indicator comprises circles gradually decreasing in size at predetermined time intervals.

7. The apparatus of claim 1, wherein the display device is a touch-sensitive display device that receives a touch input.

8. The apparatus of claim 1, wherein:
the display device includes a first touch panel display and a second touch panel display;
the apparatus comprises a portable computing device comprising:
a first chassis having the first touch panel display;
a second chassis having the second touch panel display; and
connecting parts for rotatably supporting the second chassis at least 180 degrees with respect to the first chassis; and
the keyboard is displayed on one of the first touch panel display and the second touch panel display.

9. The apparatus of claim 8, wherein, when the portable computing device is in a clamshell state, the display device displays the keyboard on the first touch panel display, and the at least one indicator comprises a band that extends in a horizontal direction to include the at least one key of the keyboard and pointing marks on the second touch panel display to point the at least one key of the keyboard from a vertical direction.

10. A method comprising:
displaying, by use of a processor, a keyboard on a display device; and
displaying on the display device at least one indicator that emphasizes at least one key of the keyboard, wherein the at least one indicator is separate from the at least one key of the keyboard, displaying the keyboard on the display device comprises displaying a QWERTY layout keyboard, and the at least one key comprises "F" and "J" keys that correspond to positions on the display device on which left and right index fingers are positioned when an operator's hands are on a home position of the keyboard.

11. The method of claim 10, wherein displaying the at least one indicator comprises displaying at least one of a horizontal indicator and a vertical indicator.

12. The method of claim 10, wherein displaying the at least one indicator comprises displaying a band that extends in at least one of a horizontal direction and a vertical direction and includes the at least one key of the keyboard.

13. The method of claim 12, wherein displaying the band comprises displaying the band in a different color than keys of the keyboard and displaying the band to blink.

14. The method of claim 10, wherein displaying the at least one indicator comprises displaying at least one pointing mark positioned outside of the keyboard area, and displaying the at least one pointing mark comprises displaying the at least one pointing mark to point to the at least one key in at least one of a horizontal direction and a vertical direction.

15. The method of claim 10, wherein displaying the at least one indicator comprises displaying circles gradually decreasing in size at predetermined time intervals.

16. A program product comprising a non-transitory computer readable storage medium that stores code executable by a processor, the executable code comprising code to perform:
displaying a keyboard on a display device; and
displaying on the display device at least one indicator that emphasizes at least one key of the keyboard, wherein the at least one indicator is separate from the at least one key of the keyboard, displaying the keyboard on the display device comprises displaying a QWERTY layout keyboard, and the at least one key comprises "F" and "J" keys that correspond to positions on the display device on which left and right index fingers are positioned when an operator's hands are on a home position of the keyboard.

17. The program product of claim 16, wherein displaying the at least one indicator comprises displaying at least one of a horizontal indicator and a vertical indicator.

18. The program product of claim 16, wherein displaying the at least one indicator comprises displaying a band that extends in at least one of a horizontal direction and a vertical direction and includes the at least one key of the keyboard.

* * * * *